No. 863,282. PATENTED AUG. 13, 1907.
G. J. KAPLAN.
COMBINED CHURN AND BUTTER WORKER.
APPLICATION FILED OCT. 20, 1906.
3 SHEETS—SHEET 1.
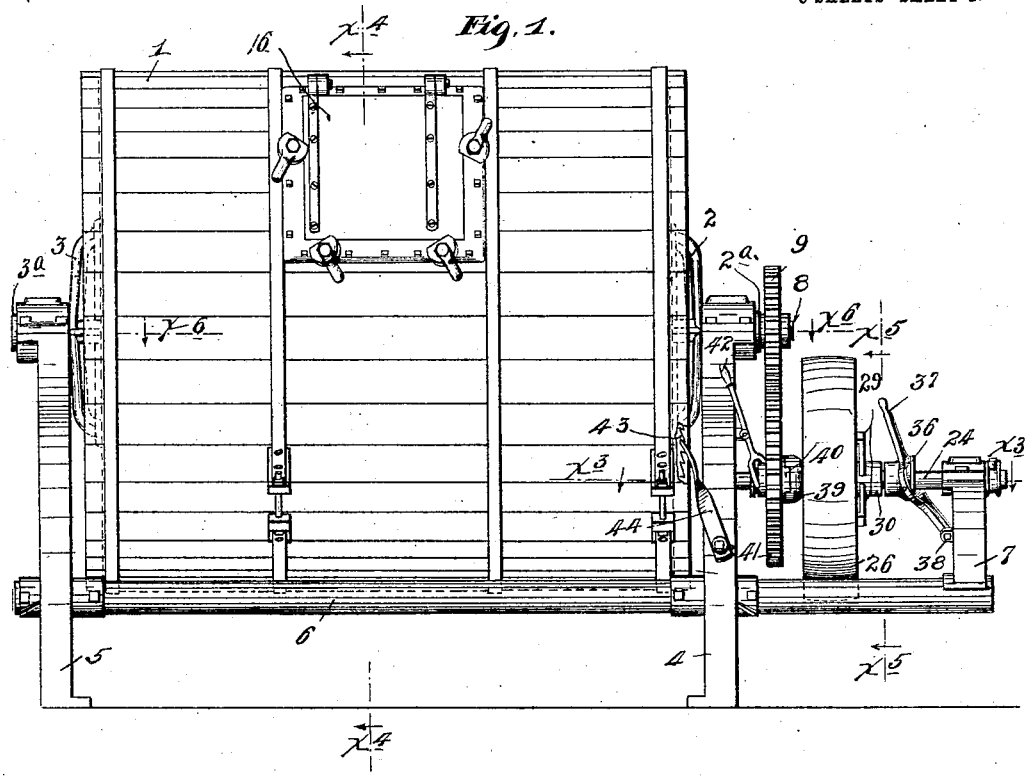

No. 863,282. PATENTED AUG. 13, 1907.
G. J. KAPLAN.
COMBINED CHURN AND BUTTER WORKER.
APPLICATION FILED OCT. 20, 1906.
3 SHEETS—SHEET 2.
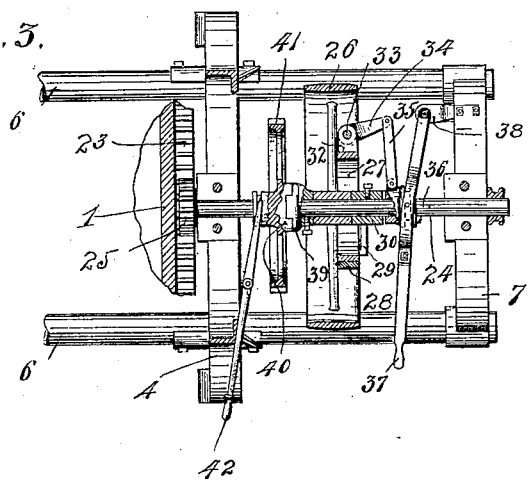
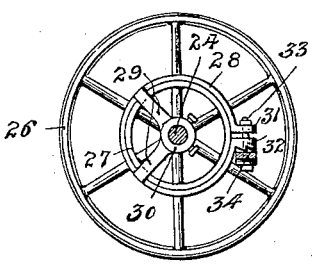
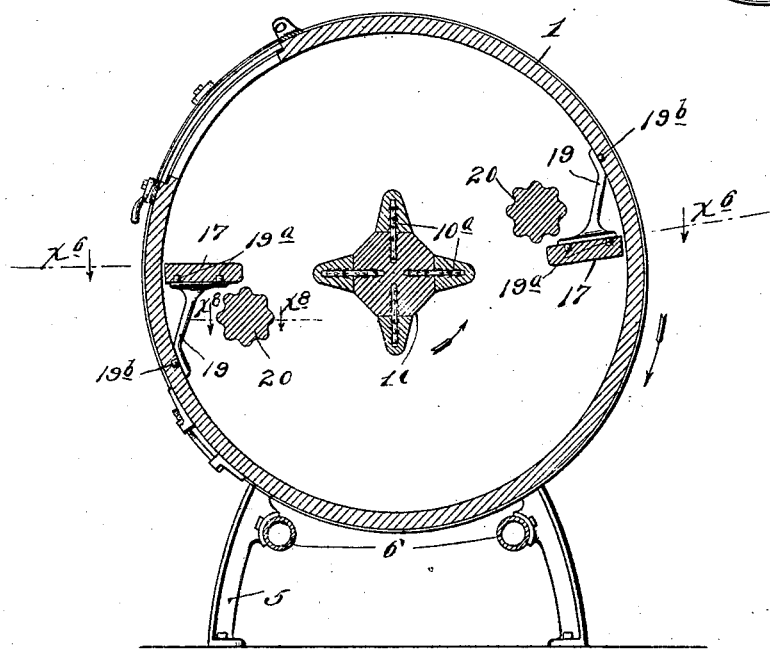

No. 863,282. PATENTED AUG. 13, 1907.
G. J. KAPLAN.
COMBINED CHURN AND BUTTER WORKER.
APPLICATION FILED OCT. 20, 1906.
3 SHEETS—SHEET 3.
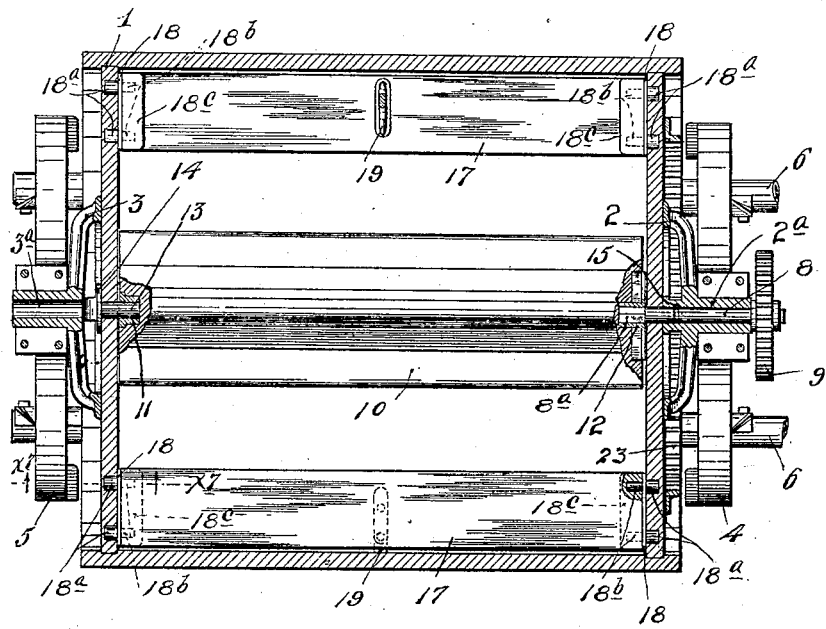

UNITED STATES PATENT OFFICE.

GODFREY J. KAPLAN, OF OWATONNA, MINNESOTA, ASSIGNOR, BY DIRECT AND MESNE ASSIGNMENTS, TO PERFECTION CHURN COMPANY, OF OWATONNA, MINNESOTA, A CORPORATION OF MINNESOTA.

COMBINED CHURN AND BUTTER-WORKER.

No. 863,282.　　　　　Specification of Letters Patent.　　　　Patented Aug. 13, 1907.

Application filed October 20, 1906. Serial No. 339,780.

*To all whom it may concern:*

Be it known that I, GODFREY J. KAPLAN, a citizen of the United States, residing at Owatonna, in the county of Steele and State of Minnesota, have invented certain new and useful Improvements in Combined Churns and Butter-Workers; and I do hereby declare the following to be a full, clear, and exact description of the invention, such as will enable others skilled in the art to which it appertains to make and use the same.

My present invention has for its object to provide a highly efficient and extremely simple combined churn and butterworker, and to this end it consists of the novel devices and combinations of devices hereinafter described and defined in the claims.

The improved machine is illustrated in the accompanying drawings, wherein like characters indicate like parts throughout the several views.

Referring to the drawings, Figure 1 is a view in side elevation, showing the improved machine. Fig. 2 is an end elevation of the improved machine. Fig. 3 is a horizontal section, with parts broken away, taken on the line $x^3\ x^3$ of Fig. 1. Fig. 4 is a transverse vertical section taken on the line $x^4\ x^4$ of Fig. 1. Fig. 5 is a detail in transverse vertical section taken on the line $x^5\ x^5$ of Fig. 1. Fig. 6 is a horizontal section taken on the line $x^6\ x^6$ of Figs. 1 and 4, some parts being broken away. Fig. 7 is a fragmentary view in vertical section, taken on the line $x^7\ x^7$ of Fig. 6; and Fig. 8 is a fragmentary detail taken on the line $x^8\ x^8$ of Fig. 4, some parts being left in full.

The numeral 1 indicates the rotary drum of the machine, which drum is horizontally disposed and has fixed heads, to the outer surfaces of which are rigidly secured spider brackets 2 and 3 that are formed with hollow trunnions $2^a$ and $3^a$, respectively. The said trunnions $2^a$ and $3^a$ are journaled, respectively, in the upper portions of heavy frame brackets 4 and 5 that are rigidly tied together by laterally spaced pairs of frame bars 6, which frame bars project at one end beyond the bracket 4 and support a bearing yoke 7. The hollow construction of the trunnion $3^a$ is incidental, but the trunnion $2^a$ is made hollow to form a bearing for a roller driving shaft 8, to the outer end of which is secured a spur gear 9.

Mounted axially within the drum and extending from end to end thereof, is a large so-called paddle roller 10. At one end, the paddle roller 10 is provided with a counter-sunk tubular bearing 11, and at its other end is provided with a counter-sunk, rigidly secured metallic socket 12 that is angular in cross section and fits the angular inner end $8^a$ of the roller driving shaft 8. The bearing 11 runs on a trunnion 13 which, as shown, projects through the adjacent head of the drum and is formed integral with a base plate 14 that is screwed or otherwise rigidly secured to the exterior of said head. The shaft 8 is normally held against endwise movements and, as shown, this is accomplished by means of a removable pin 15 driven through the trunnions $2^a$ and engaging a peripheral groove in said shaft.

When it is desired to remove the paddle roller 10 from the drum, either the shaft 8 or trunnion 13, or both, may be drawn outward so as to release the said roller and the said roller may then, by an angular endwise movement, be removed from the drum through the usual opening which is normally closed by a peripheral door 16.

Extending from end to end of the drum, at diametrically opposite points and adjacent to the inner surfaces of the cylindrical shell thereof, is a pair of lifting shelves or flights 17. These shelves may be rigidly secured within the drum in various ways, but are preferably secured by the means shown in the drawings, to-wit, by end brackets 18 and intermediate brackets 19. The said end brackets 18 are provided with dowels $18^a$ (see Fig. 7) that engage the heads of the drum, and with dowels $18^b$ that enter the ends of the said shelves. The said brackets 18 are also provided with flanges $18^c$ that underlie the ends of the rollers and greatly assist in supporting the same while they are loaded with butter being carried upward thereby under the rotation of the drum, in the direction of the arrow marked adjacent thereto in Fig. 4. The intermediate brackets 19 are provided with dowels $19^a$ that engage seats in the shelves 17, and they are provided with dowels $19^b$ that engage seats in the shell of the drum.

Located just below the inner edge of each lifting shelf 17 and extending parallel to the paddle roller and suitably journaled to the heads of the drum, is a pair of idle rollers 20 that are relatively small as compared with the paddle roller, and are preferably corrugated. These idle rollers 20 are spaced apart from the paddle roller far enough to permit the butter to be properly worked between the same. Their inner surfaces project inward beyond the inner edges of the overlying shelves 17. The said idle rollers 20 are preferably journaled directly on the trunnions 21 formed integrally with head plates 22 that are suitably secured by screws or other devices to the heads of the drum, as best shown in Fig. 8.

Rigidly secured to the exterior surface of that head of the drum which is adjacent to the frame bracket 4 is a large internal ring gear 23. A driving shaft 24 is mounted in suitable bearings on the frame bracket 4 and bearing yoke 7 (see Figs. 1 and 3) and is provided at its inner end with a spur pinion 25 that meshes with the teeth of the ring gear 23. Loosely journaled on the intermediate portion of the shaft 24, but held against sliding movements thereon, is a driving pulley 26, which pulley is adapted to be driven by a belt (not shown). The spokes of this pulley carries a laterally projecting annular clutch flange 27. The numeral 28 indicates an annular clutch ring that surrounds the clutch flange 27 and is carried by the shaft 24, its connection with the said shaft being preferably made by the arms 29 of a hub 30, which hub is secured to said shaft by set screws or other suitable devices. The clutch ring 28 is split at one point, and is provided at its ends with outwardly projecting ears 31 and 32, the latter of which is formed on its outer face with cam acting ratchet teeth. A nutted bolt 33 is passed through the ears 31 and 32, and pivoted thereon between the head thereof and the teeth of the ear 32, is a clutch lever 34, provided on its hub with ratchet teeth that coöperate with the ratchet teeth of the said ear 32. The free end of the clutch lever 34 is connected by a link 35 to a shipper collar 36 that is keyed to slide on but rotate with the shaft 24, and is subject to a shipper lever 37, shown as pivoted to a bracket 38 on the bearing yoke 7.

The construction just described is such that when the lever 37 is moved toward the left, the link 35 will be moved inward, and the free end of the clutch lever 34 will be moved outward, thereby causing the coöperating ratchet teeth or cam surfaces of said lever 34 and of the ear 32 to clamp the clutch ring 28 frictionally onto the clutch flange 34, and thereby cause the shaft 24 to rotate with the driven pulley 26. When the lever 37 is moved toward the right, or outward, reverse movements will be imparted to the link 35 and clutch lever 34, and the clutch ring 28 will be released from the clutch flange 27 so that the pulley 26 is then free to run, while the shaft 24 stands idle.

Rigidly secured to the shaft 24, just inward of the pulley 26, is a half clutch 39 that coöperates with a half clutch 40 on the hub of a spur gear 41. This spur gear 41 is mounted to rotate and slide on the shaft 24, and its sliding movements is imparted thereto by a shipper lever 42. When the gear 41 is moved so that its half clutch 40 engages the half clutch 39 it is thrown into mesh with the gear 9 of the roller driving shaft 8, so that the paddle roller 10 will then be positively rotated at a relatively high speed as compared with the rotation of the drum. When, by the shipper lever 42, the gear 40 is moved inward, it is thrown out of mesh with the gear 9, and the half clutches 39 and 40 are disengaged, so that the said paddle roller will not then be driven. In the churning action, it is sometimes desirable to throw the paddle roller 10 out of action. It will, of course, be understood that any of the well known means may be provided for securing the shipper levers 37 and 42 in either of their set positions.

From what has been said it is evident that with the clutches and gears adjusted as shown in the drawings, the drum and the paddle roller will be simultaneously rotated in reverse directions, as required in the butter working action. In the butter working action, the lifting shelves or flights 17 come into action on the butter in succession, and lift the same to a point where the butter topples over onto the paddle roller. As the butter slides from the shelf 18 which is moving upward on the rising side of the drum, it will fall in part onto the paddle roller and in part on the coöperating idle roller 20, and under the rotary movement of said paddle roller will be forced through the space between the said paddle roller and upwardly moving idle roller and will be worked downward between the two. The said idle rollers 20 reduce the friction and, hence, the power required to force the butter downward between the said two rollers.

On one head of the drum, as shown, in that head which is adjacent to the frame work 4, is rigidly secured a ratchet-toothed lock segment 43; and pivoted to said bracket 4 is a lock dog 44, the free end of which, when turned inward, as shown in Figs. 1 and 2, is adapted to engage the teeth of the said lock segment 43 to hold the drum against backward rotation under the weight of the body of butter contained within and held in a somewhat elevated position by that lifting shelf 17 which is just below the door 16. The lifting shelves or flights 17 are interlocked to the heads of the drum by the dowel-equipped coupling brackets 18; and it will be understood that the said brackets must be applied in the process or act of applying the drum heads to the cylindrical body thereof.

By reference to Fig. 4 it will be noted that the blades or projecting rib portions of the paddle rollers 10 are rigidly secured to the body portion thereof by barbed metal pins or short rods $10^a$ that are driven into alined seats of the said parts. The barbs on the opposite end portions of the said pins $10^a$ project angularly in reverse direction and are inclined toward the center of the said pins, so that the said pins may be easily driven into their respective seats, but can not be withdrawn.

What I claim is:

1. The combination with a horizontally disposed rotary drum, of a centrally disposed paddle roller within said drum, an idle roller journaled in the heads of said drum located inward from the cylindrical shell thereof and arranged to be carried around said paddle roller under rotation of said drum, and a lifting shelf arranged approximately tangential to said idle roller, and extended from a point above the said idle roller approximately to the cylindrical shell of said drum and operative, on the rising side of the drum, to direct the butter between said paddle roller and idle roller, and means for positively rotating said drum and paddle roller in opposite directions, substantially as described.

2. The combination with a horizontally disposed rotary drum, of a centrally located paddle roller within said drum, diametrically opposite idle rollers journaled in the heads of said drum and located inward from the cylindrical shell thereof, said paddle roller being of materially greater diameter than said idle rollers, and the said idle rollers having corrugations that are relatively small as compared with those of said paddle roller, lifting shelves within and carried by said drum located approximately tangential to the coöperating idle rollers and extending approximately from the shell of said drum inward into close engagement with the coöperating idle rollers, and means for positively rotating said drum and paddle roller in reverse directions, substantially as described.

3. In a machine of the kind described, the combination with a horizontally disposed rotary drum and butter working rollers therein, of lifting shelves and coupling brackets interlocked to the heads of said drum and to the ends of said shelves and irremovably holding the shelves after the heads of the drum have been applied to the shell thereof, substantially as described.

4. In a machine of the kind described, the combination with a horizontally disposed rotary drum, and butter working rollers therein, of lifting shelves within said drum, and coupling brackets having dowels seated in the ends of said shelves and in the heads of said drum and interlocking the said parts, together, substantially as described.

5. In a machine of the kind described, the combination with a suitable frame work, of a horizontally disposed rotary drum mounted thereon, a centrally disposed paddle roller mounted within said drum and provided with a projecting shaft, a gear on said roller shaft, a driving shaft mounted on said frame work, a loose pulley on said driving shaft, a clutch for connecting said loose pulley to said driving shaft, a half clutch carried by said driving shaft, and a gear loose on said driving shaft for both rotary and sliding movements and provided with a half clutch for engaging the half clutch of said driving shaft, and which gear is movable laterally into and out of mesh with the gear on said roller shaft, substantially as described.

In testimony whereof I affix my signature in presence of two witnesses.

GODFREY J. KAPLAN.

Witnesses:
 NELS NELSON,
 S. G. KINNEY.